Sept 10, 1957 D. E. BERGER ET AL 2,806,144
INFRARED ANALYZER
Filed Sept. 15, 1953 4 Sheets-Sheet 1

INVENTORS
D. E. Berger and
J. R. Parsons
BY
Hudson + Young
ATTORNEYS

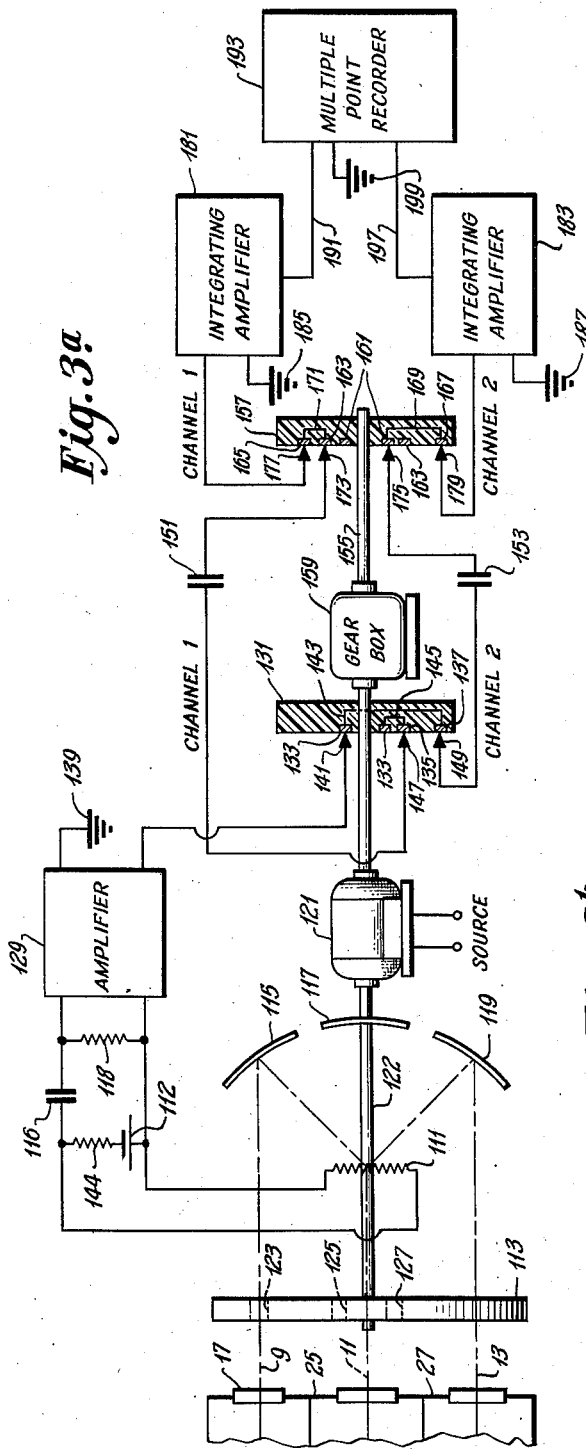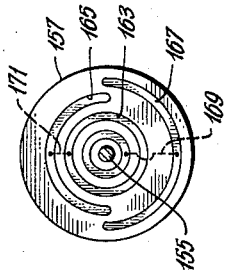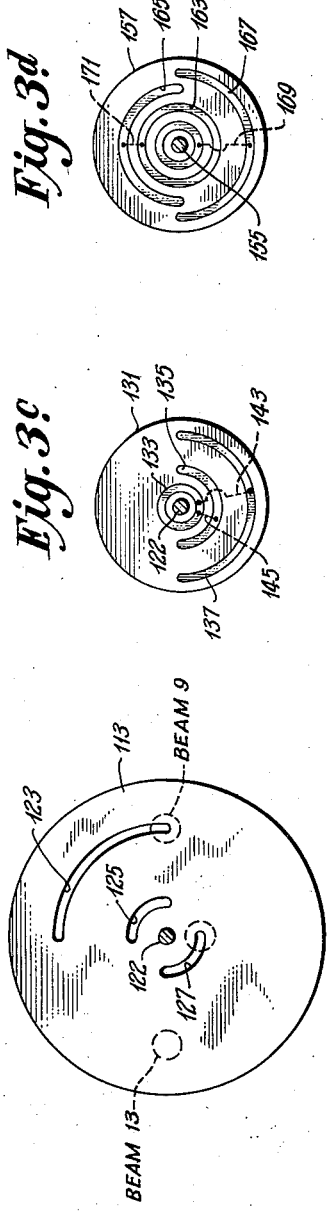

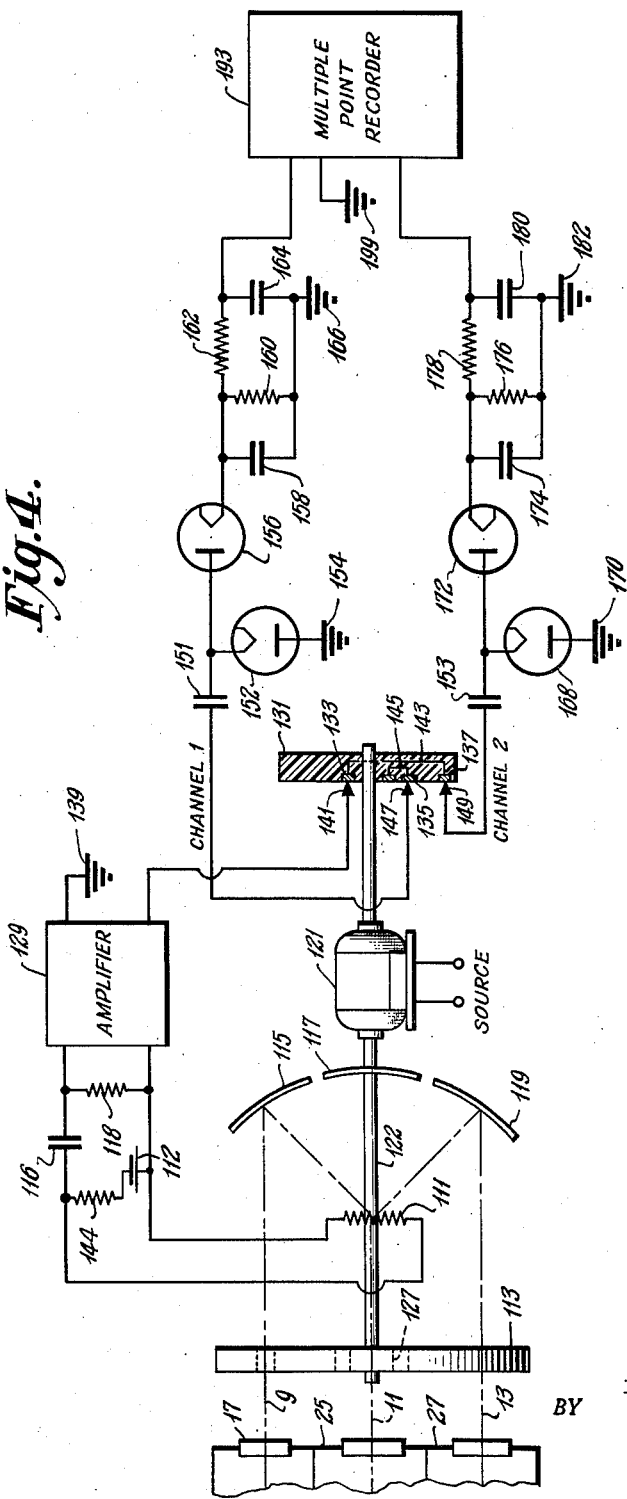

United States Patent Office 2,806,144
Patented Sept. 10, 1957

2,806,144

INFRARED ANALYZER

Donald E. Berger and James R. Parsons, Bartlesville, Okla., assignors to Phillips Petroleum Company, a corporation of Delaware Application September 15, 1953, Serial No. 380,302

16 Claims. (Cl. 250—43.5)

This invention relates to an analyzer. In a more specific aspect, this invention relates to an analyzer in which radiation is passed through a sample to be analyzed, changes in properties or composition of the sample producing representative changes in the transmission of the radiation. In a further aspect, this invention relates to a method and apparatus for analyzing a fluid stream for two components, substantially simultaneously.

Recording infra-red gas analyzers have been devised which automatically measure the absorption of infra-red radiation by various organic mixtures. Such analyzers are of particular value in the petroleum and chemical industries for recording and control purposes wherein a continuous analysis of a component or components of a fluid stream is required.

Heretofore, analyzers have been proposed in which a beam of radiation passes between a source and a radiation detector, arrangements being provided for successively interposing various samples of fluids to be analyzed between the radiation source and detector, the resultant changes in the radiation incident upon the detector being representative of the composition of the sample. While excellent results have been obtained with such analyzers, a need exists for an analyzer capable of analyzing a plurality of components in a sample stream, as in a refinery, without the provision of mechanical devices for providing movement and accurate optical alignment of the sample cells.

It is also known in the art to analyze for two components in a fluid stream with a conventional radiation-absorbing apparatus by converting one component to the other while recording the radiation absorption before and after the conversion of the one component.

A preferred application of our invention is to a fluid stream containing carbon monoxide and carbon dioxide. Such a stream can be the effluent gas from the regeneration of catalyst, as in fluid cracking catalyst regeneration, and, e. g., as disclosed in U. S. 2,545,162.

It is an object of this invention, therefore, to provide a method for analyzing a fluid for two of its components substantially simultaneously.

It is a further object to provide a method for analyzing a fluid stream for two of its components without the necessity for multiple sample cells which must be moved into alignment with an optical system.

It is a further object to provide a method for analyzing for two components in a fluid stream without the requirement of converting one of the components to the other.

It is yet a further object to provide a method and apparatus for independently and substantially simultaneously analyzing for carbon monoxide and carbon dioxide in the effluent gas from the regeneration of spent catalyst particles used in hydrocarbon conversion operations.

Various other objects, advantages and features will become apparent from the accompanying drawings in which:

Figure 3a is a schematic circuit diagram of another embodiment of our invention using a single radiation sensitve means and a chopping disk;

Figure 3b shows the chopping disk utilized in Figure 3a and Figure 4;

Figure 3c shows a commutator disk 131 utilized in Figure 3a and Figure 4;

Figure 3d shows a commutator disk 157 utilized in Figure 3a;

Figure 4 is a schematic circuit diagram of another embodiment of our invention using a single radiation sensitive means and a chopping disk.

Figure 1:
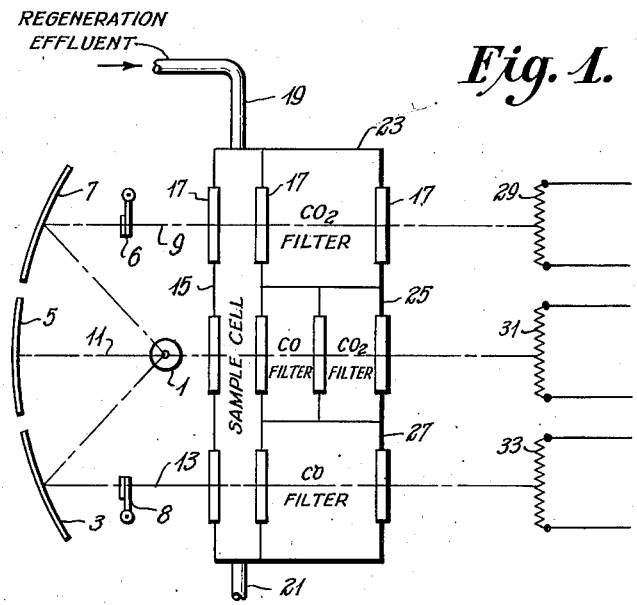
Figure 1 is a diagram of means to form three beams of radiation, two of which are each sensitized to variations in the concentration of one of two components in a sample fluid to be analyzed, the third beam being a standard or reference beam.

Referring now to Figure 1, we have shown our novel means for forming three beams of radiation, one of which is a standard beam, that is, insensitive to variations in concentration of either of the components of interest in the fluid stream, and two sensitized beams, one of which is sensitize to one of the components of interest and the other sensitized to the other component of interest. Our method and apparatus for forming these beams comprises a source of radiation and three mirrors, preferably front-surface concave mirrors, to collimate the radiation into three beams which pass through a common sample cell. Immediately adjacent the sample cell are three filter cells positioned so that each beam passes through one of said filter cells. The filter cell through which is passed the standard beam comprises substances which absorb the radiation at the principal absorption bands of both of the components of interest. One of the other filter cells comprises a substance which absorbs the radiation at the principal absorption band of one of the components of interest and the other filter cell comprises a substance which absorbs the radiation at the principal absorption band of the other component of interest. Thus, the three parallel beams of radiation emerging from the three filter cells impinge on three radiation sensitive means and produce variations in the resistance of said radiation sensitive means which is proportional to the concentration of the particular component to which the particular beam has been sensitized.

In particular, in Figure 1 we have shown a source 1 of infra-red or other suitable radiation, which is reflected by three mirrors 3, 5 and 7, perferably front-surface concave mirrors, to thereby form three parallel beams of radiation 9, 11 and 13. Trimmers 6 and 8 are manually operated to block beams 9 and 13, respectively, to the extent desired, and afford a means for balancing the intensity of radiation, initially, which falls on radiation sensitive means 29 and 33. Said beams 9, 11 and 13 pass through a common sample cell 15 provided with windows 17 which are transparent to the radiation used. In the case of infra-red radiation, the windows may be formed from a halide, such as silver chloride, calcium fluoride, sodium fluoride, or from quartz. Sample cell 15 is further provided with an inlet 19 and an outlet 21 and, thus sample cell 15 is adapted to contain a fluid stream to be tested, such as the effluent gas from the regeneration of spent catalyst particles used in hydrocarbon conversion processes.

Adjacent sample cell 15 are filter cells 23, 25 and 27, provided with windows 17 and positioned as shown so that beams 9, 11 and 13 leaving sample cell 15 pass through filter cells 23, 25 and 27, respectively. Filter cell 23 contains a substance which preferentially absorbs the radiation in beam 9 at the wave lengths of the principal absorption bands of one of the components of interest in said fluid stream, e. g., carbon dioxide. Filter cell 25 contains substances which preferentially absorb the radiation in beam 11 at wave lengths of the principal absorption bands of both of the components of interest in said fluid stream, e. g., carbon monoxide and carbon dioxide. Filter cell 27 contains a substance which preferentially absorbs the radiation in beam 13 at the wave lengths of the principal absorption bands of the other of the components of interest in said fluid stream, e. g., carbon monoxide.

Beam 9, having passed through sample cell 15 and filter cell 23, is thereby sensitized to one of the components in the fluid stream to be tested, e. g., carbon monoxide. Beam 11, having passed through sample cell 15 and filter cell 25, thus becomes a standard beam insensitive to changes in the content of either of the two components, e. g., carbon monoxide and carbon dioxide of the fluid stream to be tested. Beam 13, having passed through sample cell 15 and filter cell 27, becomes sensitized to the other of the components of the fluid stream to be tested, e. g., carbon dioxide.

Radiation beams 9, 11 and 13 then impinge on a thermal sensitive resistor, preferably in this embodiment three radiation sensitive means 29, 31 and 33, such as bolometers, thermocouples or thermistors, producing temperature changes therein which, in turn, vary the electrical resistance of said thermal sensitive resistor. For this purpose, we generally prefer to use thermistors. With the apparatus arranged as described and shown, a differential in resistance is created between thermistors 29 and 31 and between thermistors 33 and 31 which indicates the amounts of the components being tested in the fluid stream. It is to be noted that it is within the scope of our invention to utilize other types of radiation, such as visible light or ultra-violet radiation, so long as the detector produces an output corresponding to variations in the composition of the fluid stream being tested.

Figure 2:
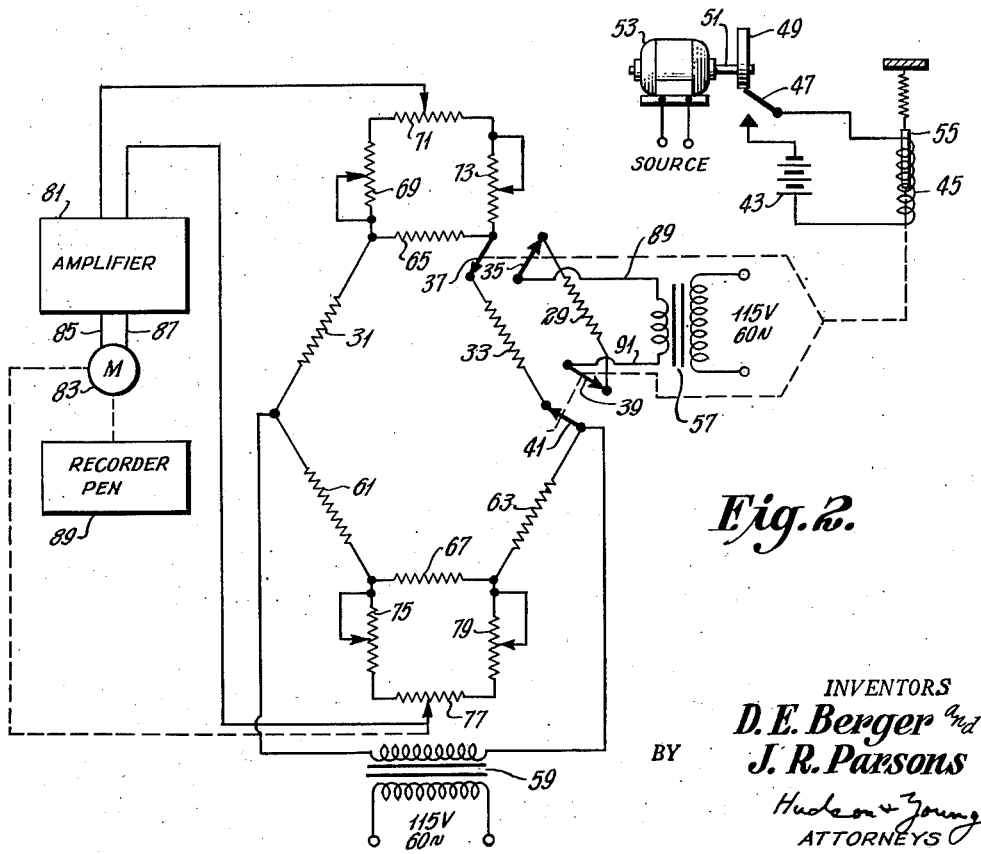
Figure 2 is a schematic circuit diagram of one embodiment of our invention, using multiple radiation sensitve means incorporated in a Wheatstone bridge.

Referring now to Figure 2, thermistors 29, 31 and 33 are connected in a Wheatstone bridge circuit, including solenoid operated ganged switches 35, 37, 39 and 41 which are provided to alternately connect thermistors 29 and 33 to the bridge circuit. A current source 43 is connected in circuit with a solenoid coil 45 and a switch 47 which is periodically opened and closed by a cam 49 on a shaft 51 connected to a timer motor 53. Timer motor 53 can operate to rotate shaft 51 at speeds from one revolution per minute to 5 revolutions per hour, or slower, thus closing switch 47 at a frequency from once a minute to once every 12 minutes. Furthermore, switch 47 can be manually closed whenever desired. A core 55 within solenoid coil 45 is spring biased upwardly, Figure 2, and, upon closing of switch 47, core 55 is pulled downwardly, thus reversing ganged switches 35, 37, 39 and 41.

A feature of the embodiment of our invention in Figure 2 is the provision for a heater circuit to maintain the thermistor which is disconnected from the Wheatstone bridge circuit at the same temperature as the two thermistors connected in the Wheatstone bridge circuit, disregarding temperature differences due to radiation. To this end transformer 57 produces one-half as much voltage across its secondary windings as is produced across the secondary windings of transformer 59 and thereby supplies one-half the voltage to the disconnected thermistor as the voltage supplied by transformer 59 to the bridge circuit. This is necessary because transformer 59 continually heats two of the arms of the bridge while transformer 57 only heats the particular thermistor which is disconnected from the bridge circuit. By this arrangement time lag, a matter of minutes required for the transformer 59 to heat up the thermistors, is avoided before the system is stabilized when a particular thermistor is disconnected from the bridge circuit and another thermistor is connected to the bridge circuit. Another source of voltage, for example a battery, can be used to supply the potential to the disconnected thermistor. Of course, the above-described heater circuit may be eliminated completely. In general, we prefer to incorporate it as shown where the sensing elements, i. e., bolometers, resistors, etc., exhibit considerable thermal inertia; however, when faster sensing elements are used, the heater circuit can be dispensed with.

With the ganged switches in the position shown, Figure 2, thermistors 33 and 31 are connected in a Wheatstone bridge circuit with balancing resistors 61 and 63. Transformer 59 is a source of alternating current and has one terminal thereof connected to the junction between units 31 and 61, the other terminal being connected to the junction between units 41 and 63. A series resistor 65 is connected between thermistors 31 and 33 and a series resistor 67 is connected between resistors 61 and 63. Resistor 65 is shunted by a unit including a variable resistor 69, a potentiometer 71 and a variable resistor 73, all connected in series. Resistor 67 is shunted by a unit including a variable resistor 75, a potentiometer 77 and a variable resistor 79, all connected in series.

Variable resistors 69 and 73 can be connected to a common control shaft in such fashion that rotation of the shaft increases ohmic value of one of said resistors and decreases the ohmic value of the other variable resistor. Thus, these ganged resistors may be used as an auxiliary balancing control for the bridge circuit since rotation of the shaft increases the resistance on one side of potentiometer 71 and decreases the resistance on the other side of potentiometer 71. Variable resistors 75 and 79 can also be connected to a common control shaft. Adjustment of this shaft, however, either increases or decreases the ohmic value of both resistors simultaneously. This control permits adjustment of the sensitivity of the bridge circuit. Thus, when the resistance of the units 75 and 79 is high, full scale movement of potentiometer 77 produces only a small variation in the balance point of the bridge due to the relatively large series resistance in circuit therewith. When the resistance of units 75 and 79 is small, adjustment of potentiometer 77 covers a wide range of balancing conditions since the series resistance in circuit therewith is relatively small.

The arm of potentiometer 71, which is normally adjusted to the center of potentiometer 71, is connected to one input terminal of amplifier 81 and the arm of potentiometer 77 is connected to the other input terminal of amplifier 81. The output of amplifier 81 energizes a motor 83 which is mechanically connected to the control shaft of potentiometer 77. To this end the output terminals of amplifier 81 are connected by leads 85 and 87 to the input terminals of balancing motor 83. The balancing motor 83 and potentiometer 77 preferably constitute elements of a recording or controlling circuit, as will be understood by those skilled in the art. This circuit may be used to provide a continuous record of the analysis of the sample and, in addition, it may be used to control the process by which the sample is produced as will become apparent from the following description. Balancing motor 83 is reversible and amplifier 81 has an output such that balancing motor 83 is rotated in one direction when the signal from the bridge indicates an unbalance on one side and it is rotated in the opposite direction when the bridge is unbalanced on the opposite side.

With the ganged switches in the position shown, Figure 2, thermistors 31 and 33 are connected in the bridge circuit with balancing resistors 61 and 63 and the apparatus is recording the amount of carbon dioxide in the fluid stream being tested. Also, the secondary coil of transformer 57 is connected in series with thermistor 29 through lead 89, switch 35, thermistor 29, switch 39 and lead 91. With the ganged switches reversed, thermistors 29 and 31 are connected in the bridge circuit with balancing resistors 61 and 63 and the apparatus is recording the amount of carbon monoxide in the fluid stream being tested. Accordingly, thermistor 33 is being heated by current from the secondary coil of transformer 57, and the circuit may be traced, lead 89, switch 35, thermistor 33, switch 39, and lead 91.

In the operation of the embodiment of our invention in Figures 1 and 2, the fluid stream, such as described hereinbefore, is passed through conduit 19 to sample cell 15 and disposed of, or utilized as desired, via conduit 21. An analysis for carbon monoxide and carbon dioxide in said fluid stream can be made with filter cell 23 comprising carbon dioxide, filter cell 25 comprising carbon monoxide and carbon dioxide and filter cell 27 comprising carbon monoxide. Filter cells 23, 25 and 27 can also comprise or be replaced by solid material which absorbs the radiation at the desired wave lengths. Infrared radiation formed into three beams, as shown in Figure 1, impinges on thermistors 29, 31 and 33, and with the ganged switches in the position shown in Figure 2, the impedance of thermistors 31 and 33 is changed by reason of the impinging beams 13 and 11, with resultant unbalance of the bridge circuit. This unbalance voltage appears across the arms of potentiometers 71 and 77 and is fed to amplifier 81, with the result that motor 83 moves potentiometer 77 to restore the bridge to a balanced condition. The movement of the arm of potentiometer 77, effected in balancing the bridge in this manner, is an indication of the percentage variation of the carbon dioxide in beam 13 from that in the standard beam 11. This deviation may be recorded by a recorder pen 89 actuated by potentiometer 77 and, if desired, this movement of the potentiometer may actuate control equipment in a well understood manner to change a process variable and bring the composition of the fluid stream to a desired analysis. Similarly, with the ganged switches 35, 37, 39 and 41, Figure 2, reversed, the impedance of thermistors 29 and 31 is changed, by reason of the impinging beams 9 and 11, with resultant unbalance and rebalance of the bridge circuit as described above, and an analysis for the amount of carbon monoxide in said fluid stream obtained.

Referring now to Figure 3a we have shown another embodiment of our invention employing a single thermistor 111 on which impinges all three beams, 9, 11 and 13, in turn by virtue of a chopping disk 113 and three preferably front-surface concave mirrors 115, 117 and 119 which reflect said beams so as to converge them on thermistor 111. A motor 121 drives a shaft 122 to which is rigidly attached chopping disk 113. Chopping disk 113 has slots 123, 125 and 127 cut out to permit periodic interruption and transmission of each beam as disk 113 is rotated clockwise, as shown in Figure 3b. Figure 3b illustrates chopping disk 113 to further show the arrangement of slots 123, 125 and 127. Slot 123 comprises an arc through one-fourth of disk 113, and is so placed that beam 9 strikes slot 123. Slot 125 similarly comprises an arc through one-fourth of the chopping disk 113 and is placed adjacent to slot 123 but with a substantially smaller radius. Slot 125 is arranged so that beam 11 will be transmitted through it as disk 113 is rotated. Slot 127 comprises an arc through one-fourth of the chopping disk 113 and has a radius equal to that of slot 125, however, the open ends of the arc described by slot 127 are opposite to the open ends of the arc described by slot 125. It will be apparent that as chopping disk 113 is rotated clockwise through one complete revolution, the sequence of the radiation beams falling on thermistor 111 is beam 9, beam 11, beam 13 and beam 11.

In place of thermistor 111, which is generally considered to be a semi-conductor having a pair of terminals and a negative temperature coefficient, can also be any of the radiation sensitive means heretofore used in commercial infra-red spectrographic apparatus.

Thermistor 111 is biased by a direct voltage source here shown as a battery 112. Resistance element 144 is in series with battery 112 and thermistor 111 and the potential variations appearing across the thermistor terminals are applied to the input of amplifier 129 through a circuit comprising series condenser 116 and shunt resistance 118. This coupling wholly or very largely removes the slowly varying direct components of the voltage resulting from slow changes in the temperature of the surrounding air or undue rapid heating of the thermistor element from excessively large intensity of the incident radiation beams.

It is to be noted that in the place of thermistor 111 there may be used a high speed thermocouple or thermopile which upon receiving the beams of radiation will generate their own potential and which is applied directly to the input terminals of amplifier 129.

Also rigidly attached to shaft 122 is a commutator disk 131, shown in Figure 3c, which is a solid circular disk of non-conducting material. Concentrically placed therein are an annular ring 133, a concentrically placed half-circle annular segment 135 of greater radius than ring 133 and a concentrically placed half-circle annular segment 137 of greater radius than segment 135. Units 133, 135 and 137 are formed of metallic or other conducting material.

Amplifier 129 is connected to a ground 139 and an output terminal of amplifier 129 is connected to a brush 141 which is in contact with ring 133. Ring 133 is connected by lead 143 to segment 137, which is a half-ring, and ring 133 is connected by lead 145 to segment 135, which is a half-ring of smaller radius than segment 137. The output of commutator disk 131 is carried by channels 1 and 2 and segments 135 and 137 are the output terminals of commutator disk 131.

Channel 1 is connected at one end to brush 147 which makes contact with segment 135 and channel 2 is connected at one end to brush 149 which makes contact with segment 137. Coupling condensers 151 and 153 are placed in channels 1 and 2, respectively.

A shaft 155, to which is rigidly attached a commutator disk 157, is connected to a gear box 159, with a 1:2 gear ratio, which is attached to shaft 122, and commutator disk 157 is thus rotated at twice the speed of commutator disk 131.

Commutator disk 157, shown in Figure 3d, is constructed of materials similar to commutator disk 137 and has concentrically placed therein an annular ring 161, a concentrically placed annular ring 163 of greater radius than ring 161, a concentrically placed half-circle annular segment 165 of greater radius than ring 163, and a concentrically placed half-circle annular segment 167 of greater radius than segment 165 and with the open ends of half-circle segment 167 opposite to the open ends of half-circle segment 165. Ring 161 is connected by lead 169 to segment 167 and ring 163 is connected by lead 171 to segment 165. Rings 161 and 163 are the input terminals of commutator disk 157. Channel 1 is connected at its other end to brush 173 which makes contact with ring 163 and channel 2 is connected at its other end to brush 175 which makes contact with ring 161.

The output of commutator disk 157 is carried by channels 1 and 2 and segments 165 and 167 are the output terminals for commutator disk 157. In the output circuit of commutator disk 157, channel 1 is connected at one end to brush 177 which makes contact with segment 165 and channel 2 is connected at one end to brush 179 which makes contact with segment 167.

In the output circuit of commutator disk 157, channel 1 is connected at its other end to an input terminal of an integrating amplifier 181 and channel 2 is connected at its other end to an input terminal of an integrating amplifier 183. Integrating amplifier 181 is connected to a ground 185 and integrating amplifier 183 is connected to a ground 187. An output terminal of integrating amplifier 181 is connected by a lead 191 to one input terminal of a multiple point recorder 193. An output terminal of integrating amplifier 183 is connected by a lead 197 to the other input terminal of multiple point recorder 193. Multiple point recorder 191 is connected to a ground 199.

Figure 5A:
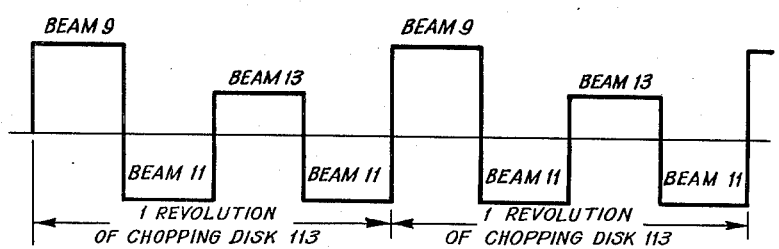
Figures 5a, 5b, 5c, 5d and 5e are diagrams of the wave forms of the electrical current generated by the embodiment of our invention illustrated in Figure 3a and Figure 4.

In the operation of the embodiment of our invention shown in Figure 3a, the fluid stream to be analyzed for two components, such as carbon monoxide and carbon dioxide, is passed to sample cell 15 as in Figure 1. Three parallel beams of radiation 9, 11 and 13 are formed, as in Figure 1, and upon passing through filter cells 23, 25 and 27, beam 9 is sensitized to carbon monoxide, beam 11 is a standard beam insensitive to changes in carbon monoxide and carbon dioxide and beam 13 is sensitized to carbon dioxide. By the periodic interruption and transmission of beams 9, 11 and 13 by chopping disk 113, and by the convergence of said beams by mirrors 115, 117 and 119, radiation falls on thermistor 111 with each revolution of chopping disk 113, in the sequence beam 9, beam 11, beam 13 and beam 11, thereby establishing a pulsed direct current which is impressed upon amplifier 129. The pulses of direct current thus generated are proportional to the intensity of the radiation in beams 9, 11 and 13 falling on thermistor 111. The amplified pulses are fed from amplifier 129 to commutator disk 131 which is rotating at the same speed as chopping disk 113. The wave form of the output of amplifier 129 is further illustrated in Figure 5a, and is a modified square wave, as shown, with the amplitude of the pulses being proportional to the intensity of the radiation falling on thermistor 111.

Figure 5B:
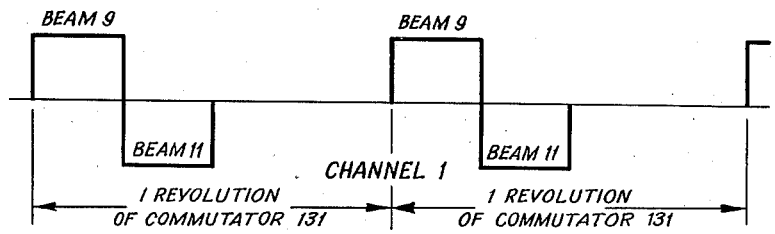
Figure 5C:
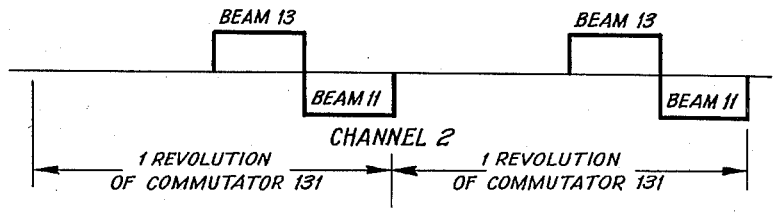

With each revolution of commutator disk 131, the output of amplifier 129 is separated so that channel 1 carries the pulses of current responsive to beams 9 and 11, in sequence, and channel 2 carries the pulses of current responsive to beams 13 and 11, in sequence. The wave form of the output of commutator 131, is further illustrated in Figures 5b and 5c.

Commutator disk 157 rotates at twice the speed of commutator disk 131 which provides a pulsed current for recording purposes in the output of commutator disk 157 which is carried by channels 1 and 2 with the pulses indicative of and proportional to the components being tested for in the fluid stream. Channel 1 carries the pulses responsive to beam 9 and channel 2 carries the pulses responsive to beam 13. The wave form of the pulsed current carried in channels 1 and 2, which is the output of commutator disk 157, is illustrated further in Figures 5d and 5e. The pulsed current in channels 1 and 2 is integrated and amplified in integrating amplifiers 181 and 183, respectively, and the output of integrating amplifiers 181 and 183 is fed to the multiple point recorder 193, which thereby indicates and records the amounts of carbon monoxide and carbon dioxide in the fluid stream being tested.

Referring now to Figure 4, we have shown another embodiment of our invention. Figure 4 is a duplicate of Figure 3a from the beginning through commutator disk 131, channels 1 and 2 therefrom, and including coupling condensers 151 and 153. However, in Figure 4, channel 1, after passing through coupling condenser 151, then passes through a voltage-doubling circuit and an integrating circuit to one input terminal of multiple point recorder 193. The voltage-doubling circuit comprises a diode 152 with its anode connected to ground 154 and its cathode connected to condenser 151, and a diode 156 with its anode connected to condenser 151. The cathode of diode 156 is connected to a condenser 158 which is grounded. Condenser 158 is connected in parallel with resistor 160 and to the integrating circuit, which comprises series resistance 162 and condenser 164 which is connected to a ground 166.

Also, in Figure 4, channel 2, after passing through coupling condenser 153, passes through a voltage-doubling circuit and an integrating circuit to the other input terminal of multiple point recorder 193. Again, the voltage-doubling circuit comprises a diode 168 with its anode connected to a ground 170 and its cathode connected to condenser 153, and to the anode of diode 172. The cathode of diode 172 is connected to a condenser 174 which is grounded. Condenser 174 is connected in parallel with resistance 176 and to the integrating circuit, which comprises series resistance 178, and condenser 180, which is connected to a ground 182. As in Figure 3a, multiple point recorder 193 is connected to a ground 199.

Figure 5D:
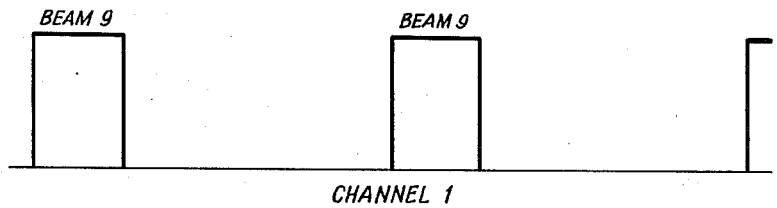
Figure 5E:
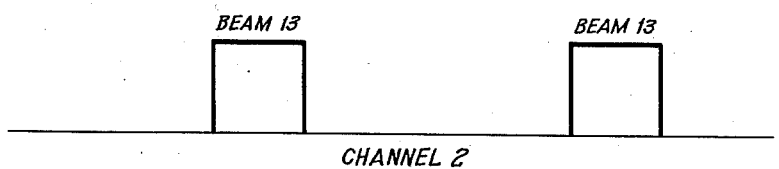

The operation of the embodiment of our invention illustrated in Figure 4 is identical wtih the operation described above for Figure 3a through the signal output of commutator disk 131 which is carried by channels 1 and 2. However, in Figure 4, the pulsed signal in channels 1 and 2, illustrated in Figures 5b and 5c, passes through coupling condensers 151 and 153 to the voltage doubling circuits. The operation of the voltage doubling circuit carrying the pulsed signal in channel 1 can be explained, as follows. Ignoring diode 156, coupling condenser 151 will charge to the peak voltage in channel 1 and the potential at a point between coupling condenser 151 and the cathode of diode 152 will fluctuate between zero and twice the peak voltage of the signal in channel 1. With diode 156 connected, as shown, this peak voltage is applied to the anode of diode 156 and will tend to charge condenser 158 to this peak voltage, thereby supplying a signal to the integrating circuit which has twice the voltage of the signal in channel 1 entering the doubling circuit. The voltage doubling circuit develops an output voltage equal to the peak voltage of the input signal. This peak to peak voltage is the difference in thermistor output between beams 9 and 11, or 11 and 13. The wave form of the signal in channels 1 and 2 after doubling is illustrated in Figures 5d and 5e. The doubled, pulsing signal passes through an integrating circuit which comprises series resistance 162 and condenser 164 and thereby becomes an average or smoothed-out signal for recording purposes. The described operation is, of course, the same in the case of channel 2.

We wish to note that the method and apparatus of U. S. Patent No. 2,579,825, for calibrating the Wheatstone bridge circuit periodically and automatically to compensate for effects produced by variations in ambient temperature, aging of circuit components and other factors, can be readily adapted to our invention. U. S. Patent No. 2,579,825 teaches a method and apparatus for this purpose, comprising a variable resistance means connected in a circuit with radiation sensitive devices, the impedance of said devices being proportional to the intensity of radiation thereon, and a motor driven means responsive to an unbalance voltage in said circuit for adjusting the variable impedances to eliminate the unbalance voltage and balance the circuit. In adapting this feature of U. S. Patent No. 2,579,825 to our invention, some additional apparatus elements will be required but such an adaption is well within the skill of the art having once been given the present disclosure.

As was stated before, a preferred application of our invention is for analyzing the effluent gas from the regeneration of catalysts, as in fluid catalytic cracking catalyst regeneration. In organic reactions using subdivided catalysts or powdered catalysts, the catalyst particles become deactivated by combustible deposits which have to be removed before the catalysts can be used over again. In the catalytic conversion of hydrocarbons, coke or carbonaceous material is deposited on the catalyst particles which results in deactivation of the catalyst particles and these deposits are usually removed by burning with air or oxygen-containing gas. During regeneration by burning, the effluent gases contain carbon dioxide, carbon monoxide and air, and when these gases pass through certain parts of the regeneration unit, there is a possibility of burning of the carbon monoxide to form carbon dioxide. This burning is generally referred to as after-burning, and is more apt to occur in the dilute phase, that is, in the relatively light suspension of solids in gases remaining after most of the solid particles have been removed from the gas. After-burning is not critical in the dense bed because there are sufficient solids present to absorb the heat released by regeneration and excessive temperatures do not result from the combustion in the bed. When after-burning occurs in the dilute phase, the gases rapidly attain an extremely high temperature resulting in the overheating of catalyst particles and in possible damage to the equipment. However, the most efficient use of the air is made by producing a maximum of carbon monoxide and thereby producing less total heat. The temperature at which the maximum carbon burning to carbon monoxide occurs is also high enough to provide the combustion of carbon monoxide to carbon dioxide. Thus, a regeneration furnace which is being pushed to maximum production must maintain the mass of combustible material in a very unstable state from a combustion viewpoint. It is known that a distinct drop in carbon monoxide content and an increase in carbon dioxide content in the effluent gases occurs a few minutes before any indication of temperature rise can be noted. Thus, an application of our invention analyze for carbon monoxide and carbon dioxide in such effluent gases can be most valuable to indicate when after-burning may occur before it occurs in serious proportions. The results of such after-burning, therefore, are to materially decrease the efficiency of the regeneration operation. In accordance with our invention, the possibility of after-burning can be substantially eliminated and a means for controlling operating variables is provided by obtaining a continuous and substantially instantaneous record of the carbon monoxide and carbon dioxide content in the regenerator flue gases.

It will be apparent that we have provided a method and apparatus for substantially simultaneously analyzing for two components of a fluid stream using one instrument. It will be obvious that our invention can be applied to other gases than carbon monoxide and carbon dioxide and while the invention has been described in connection with a present, preferred embodiment thereof, it is to be understood that this description is illustrative only and is not intended to limit the invention, the scope of which is defined by the appended claims.

We claim:

1. In a photometric analyzer for measuring the amounts of two components, A and B, in a fluid stream, in combination, a radiation source, reflecting means to form therefrom three radiation beams, a sample cell with an inlet and an outlet and disposed in the path of said beam and adapted to receive said fluid stream through said inlet and said outlet, three filtering means, each of which is disposed in the path of one of said beams and is adapted to preferentially absorb certain wave lengths of said radiation, the first of said filtering means preferentially absorbing said radiation at the wave length of the principal absorption band of component A, the second of said filtering means preferentially absorbing said radiation at the wave lengths of the principal absorption bands of components A and B, and the third of said filtering means preferentially absorbing said radiation at the wave length of the principal absorption band of component B, three radiation sensitive means each disposed in the path of one of said beams, a comparison circuit incorporating said radiation sensitive means which is disposed in the path of said beam passing through said second filtering means, electrical switching means to alternately incorporate the other two radiation sensitive means in said comparison circuit, an amplifier connection to the output of said comparison circuit, and a multiple point recorder connected to the output of said amplifier.

2. In a photometric analyzer for measuring the amounts of carbon monoxide and carbon dioxide in a fluid stream, in combination, a source of infra-red radiation, reflecting means to form three beams of said infrared radiation, a sample cell disposed in the path of said three beams with an inlet and an outlet and adapted to receive said fluid stream through said inlet and outlet, three filtering means, each of which is disposed in the path of one of said beams and adapted to preferentially absorb certain wave lengths of said infra-red radiation, the first of said filtering means preferentially absorbing said radiation at the wave length of the principal absorption band of carbon dioxide, the second of said filtering means preferentially absorbing said radiation at the wave lengths of the principal absorption bands of carbon monoxide and carbon dioxide, and the third of said filtering means preferentially absorbing said radiation at the wave length of the principal absorption band of carbon monoxide, three radiation sensitive means each disposed in the path of one of said beams, a Wheatstone bridge in one arm of which is incorporated said radiation sensitive means disposed in the path of said beam passing through said second filtering means, electrical switching means to alternately incorporate into another arm of said bridge the other two radiation sensitive means, an amplifier connected to the output of said bridge, and a multiple point recorder connected to the output of the said amplifier.

3. In a photometric analyzer for measuring the amounts of carbon monoxide and carbon dioxide in a fluid stream, in combination, a source of infra-red radiation, reflecting means to form three beams of said infra-red radiation, a sample cell having an inlet and an outlet at opposite ends thereof and being adapted to receive said fluid stream through said inlet and outlet, three filtering means, each of which is disposed in the path of one of said beams and adapted to preferentially absorb certain wave lengths of said infra-red radiation, the first of said filtering means preferentially absorbing said radiation at the wave length of the principal absorption band of carbon dioxide, the second of said filtering means preferentially absorbing said radiation at the wave lengths of the principal absorption bands of carbon monoxide and carbon dioxide, and the third of said filtering means preferentially absorbing said radiation at the wave length of the principal absorption band of carbon monoxide, three thermistors arranged so that each thermistor receives one of said beams after passage through said sample cell and one of said filter cells, a balanced circuit in one arm of which is incorporated the thermistor which receives said beam passing through said second filtering means, electrical switching means to alternately incorporate the other two thermistors in said balanced circuit, an amplifier connected to the output of said balanced circuit, and a multiple-point recorder connected to the output of said amplifier.

4. In a photometric analyzer for measuring the amounts of carbon monoxide and carbon dioxide in a fluid stream, in combination, a source of infra-red radiation, reflecting means to form three beams of said infra-red radiation, a sample cell having an inlet and an outlet at opposite ends thereof and being adapted to receive said fluid stream through said inlet and outlet, three filtering means, each of which is in the path of one of said beams and adapted to preferentially absorb certain wave lengths of said infra-red radiation, the first of said filtering means preferentially absorbing said radiation at the wave length of the principal absorption band of carbon dioxide, the second of said filtering means preferentially absorbing said radiation at the wave lengths of the principal absorption bands of carbon monoxide and carbon dioxide, and the third of said filtering means preferentially absorbing said radiation at the wave length of the principal absorption band of carbon monoxide, three thermistors, the first of said thermistors receiving said beam passing through said first filtering means, the second of said thermistors receiving said beam passing through said second filtering means, and the third of said thermistors receiving said beam passing through said third filtering means, a Wheatstone bridge circuit, including a source of power therefore, incorporating said second thermistor in one arm of said bridge circuit, a second power source with an output voltage equal to one-half the output voltage of said source of power for said Wheatstone bridge circuit, a solenoid operated electrical switching means to alternately connect said first and third thermistors into another arm of said Wheatstone bridge circuit and, alternately thereto, connect to the thus disconnected thermistor said second power source, an amplifier the input circuit of which is connected to the output circuit of said Wheatstone bridge circuit, and a multiple-point recorder the input of which is connected to the output of said amplifier.

5. In an analyzer for measuring the amounts of two components A and B in a fluid stream, a radiant energy indicating system comprising means for forming and sensitizing three beams of radiant energy, the first of which is sensitized to changes in concentration of component A in said fluid stream, the second of which is a standard beam insensitive to changes in concentration of components A and B in said fluid stream and the third of which is sensitized to changes in concentration of component B in said fluid stream, a Wheatstone bridge and a source of power therefor, three radiation sensitive devices disposed in the paths of said three sensitized beams, respectively, and the radiation sensitive device disposed in the path of said standard beam being disposed in one arm of said bridge, the impedance of said devices being proportional to the intensity of radiation incident thereon, a second power source with a voltage equal to one-half the voltage of the source of power for said bridge, and a switching means for alternately connecting the radiation sensitive devices disposed in the path of said first and third beams into another arm of said bridge, and, simultaneously thereto, connecting said second power source to the thus disconnected radiation sensitive device.

6. In a photometric analyzer for measuring the amounts of two components, A and B, in a fluid stream, in combination, a radiation source, reflecting means to form therefrom three parallel radiation beams, a sample cell disposed in the path of said beams and having an inlet and outlet and being adapted to receive said fluid stream therethrough, three filter cells, each of which is disposed in the path of one of said beams and adapted to hold a substance preferentially absorbing certain wave lengths of said radiation source, the first of said filter cells containing a substance preferentially absorbing said radiation at the wave length of the principal absorption band of component A, the radiation beam passing through said first filter cell thereby becoming a beam sensitized to component B, the second of said filter cells containing a substance preferentially absorbing said radiation at the wave length of the principal absorption bands of components A and B, the radiation beam passing through said second filter cell thereby becoming a standard beam insensitive to components A and B, and the third of said filter cells containing a substance preferentially absorbing said radiation at the wave length of the principal absorption band of component B, the radiation beam passing through said third filter cell thereby becoming a beam sensitized to component A, a radiation sensitive means having output terminals connected therewith, reflecting means to converge said sensitized beams on said radiation sensitive means, a rotating chopper disposed in the paths of the three parallel sensitized beams and having means for periodically interrupting said beams in a manner that, with each revolution of said chopper, the said three sensitized beams impinge on said radiation sensitive means in four pulses of equal duration of time in the sequence, said beam sensitized to component B, said standard beam, said beam sensitized to component A and said standard beam, the output of said radiation sensitive means thereby becoming pulses of direct current in response to the pulses of radiation impinging on said radiation sensitive means, an amplifier having an input circuit connected to the output terminals of said radiation sensitive means and an output circuit consisting of one output terminal and a ground, a first commutator rotating synchronously with said chopper and having an input terminal connected to the output terminal of said amplifier and two output terminals, the two output terminals of said first commutator being arranged so that one of the first commutator output terminals carries the pulses of direct current from the output of said amplifier in response to said beam sensitized to component A and said standard beam and the other of the first commutator output terminals carries the pulses of direct current from the output of said amplifier in response to said beam sensitized to component B and said standard beam, a second commutator rotating at twice the speed of said first commutator and having input terminals connected to the output terminals of said first commutator and having output terminals, the output terminals of said second commutator being arranged so that one of the second commutator output terminals carries the pulses of direct current from the output of said first commutator in response to said beam sensitized to component A and the other of the second commutator output terminals carries the pulses of direct current from the output of said first commutator in response to said beam sensitized to component B, two integrating amplifiers each having one of its input terminals grounded and the other input terminal connected to one of the output terminals of said second commutator and each having an output terminal, and a multiple point recorder, the input terminals of which are connected to the output terminals of said integrating amplifiers.

7. In a photometric analyzer for measuring the amounts of carbon monoxide and carbon dioxide in a fluid stream, in combination, a source of infra-red radiation, reflecting means to form therefrom three beams of infra-red radiation, a sample cell disposed in the paths of said three beams with an inlet and an outlet and adapted to receive said fluid stream through said inlet and outlet, three filtering means, each of which is disposed in the path of one of said beams and adapted to preferentially absorb certain wave lengths of said infra-red radiation, the first of said filtering means preferentially absorbing said radiation at the wave length of the principal absorption band of carbon dioxide, the second of said filtering means preferentially absorbing said radiation at the wave lengths of the principal absorption bands of carbon monoxide and carbon dioxide, and the third of said filtering means preferentially absorbing said radiation at the wave length of the principal absorption band of carbon monoxide, means for periodically interrupting said beams for four equal periods of interruption separated by four equal intervals of passage of each beam, in sequence, a thermistor having output terminals connected therewith, said thermistor being positioned in the paths of said interrupted beams to respond thereto and to produce pulses of direct current, an amplifier having an input circuit connected to said output terminals and an output circuit, a synchronous commutator means having input terminals connected to the output circuit of said amplifier and output terminals, means for synchronizing said commutator means with the amplified pulses of direct current received from said amplifier, and an indicating instrument connected to the output terminals of said commutator means.

8. In an analyzer for measuring the amounts of two components A and B in a fluid stream, a radiant energy indicating system comprising means for forming and sensitizing three beams of radiants energy, the first beam being sensitized to changes in concentration of component A in said fluid stream, the second beam being a standard beam insensitive to changes in concentration of components A and B in said fluid stream, and the third beam being sensitized to changes in concentration of component B in said fluid stream, a rotating chopper means for interrupting said sensitized beams for four equal periods of interruption separated by four equal periods of passage of said beams with each revolution of said chopper, each of said periods of passage being a pulse of radiant energy responsive to one of said beams, the first and third of said pulses being responsive to said first and third sensitized beams, respectively, and the second and fourth of said pulses being responsive to said standard beam, a radiant energy sensitive means in position to respond to said pulses of radiant energy to produce corresponding direct current pulses, each dependent in amplitude upon the intensity of the corresponding beam pulse, and amplifying means, having output terminals and being electrically connected to said radiants energy sensitive means for amplifying said direct current pulses, a first synchronous commutator means upon which the amplified direct current pulses are impressed having input terminals connected to the output terminals of said ampifier and having output terminals, means for causing said first commutator means to act in synchronism with the impressing thereon of the successive pulses of said current components, whereby said first and second pulses are passed to one output terminal and said third and fourth pulses are passed to the other output terminal, a second synchronous commutator means having input terminals connected to the output terminals of said first commutator means and having output terminals, means for causing said second commutator means to act at a switching rate equal to twice the switching rate of said first commutator means whereby said first pulses are passed to one output terminal of said second commutator means and said third pulses are passed to the other output terminal of said second commutator means, and means for integrating, amplifying and recording the pulsed current components in the output of said second rectifier means.

9. In a photometric analyzer for measuring the amounts of two components, A and B, in a fluid stream, in combination, a radiation source, reflecting means to form therefrom three parallel radiation beams, a sample cell disposed in the path of said beams and having an inlet and outlet and being adapted to receive said fluid stream therethrough, three filter cells, each of which is disposed in the path of one of said beams and adapted to hold a substance preferentially absorbing certain wave lengths of said radiation source, the first of said filter cells containing a substance preferentially absorbing said radiation at the wave length of the principal absorption band of component A, the radiation beam passing through said first filter cell thereby becoming a beam sensitized to component B, the second of said filter cells containing a substance preferentially absorbing said radiation at the wave length of the principal absorption bands of components A and B, the radiation beam passing through said second filter cell thereby becoming a standard beam insensitive to components A and B, and the third of said filter cells containing a substance preferentially absorbing said radiation at the wave length of the principal absorption band of component B, the radiation beam passing through said third filter cell thereby becoming a beam sensitized to component A, a radiation sensitive means having output terminals connected therewith, reflecting means to converge said sensitized beams on said radiation sensitive means, a rotating chopper disposed in the paths of the three parallel sensitized beams and having means for periodically interrupting said beams in a manner that with each revolution of said chopper, the said three sensitized beams impinge on said radiation sensitive means in four pulses of equal duration of time in the sequence, said beam sensitized to component B, said standard beam, said beam sensitized to component A and said standard beam, the output of said radiation sensitive means thereby becoming pulses of direct current in response to the pulses of radiation impinging on said radiation sensitive means, an amplifier having an input circuit connected to the output terminals of said radiation sensitive means and an output circuit consisting of one output terminal and a ground, a commutator rotating synchronously with said chopper and having an input terminal connected to the output terminal of said amplifier and two output terminals, said commutator output terminals being arranged so that one of the commutator output terminals carries the pulses of direct current from the output of said amplifier in response to said beam sensitized to component A and said standard beam and the other of said commutator output terminals carries the pulses of direct current from the output of said amplifier in response to said beam sensitized to component B and said standard beam, a pair of coupling condensers, one connected to one of said commutator output terminals and the other connected to the other of said commutator output terminals, two voltage doubling circuits, each connected to one of said coupling condensers, each of said voltage doubling circuits comprising a first diode having its anode grounded and its cathode connected to said coupling condenser and a second diode having its anode connected to said coupling condenser and its cathode connected to a first grounded condenser which is connected in parallel circuit with a resistance, two integrating circuits, each connected to one of said voltage doubling circuits, each of said integrating circuits comprising a series resistance and a second grounded condenser and a multiple point recorder, the input terminals of which are connected to said second grounded condensers in said integrating circuits.

10. In a photometric analyzer for measuring the amounts of carbon monoxide and carbon dioxide in a fluid stream, in combination, a source of infra-red radiation, reflecting means to form therefrom three beams of infra-red radiation, a sample cell disposed in the paths of said three beams with an inlet and an outlet and adapted to receive said fluid stream through said inlet and outlet, three filtering means, each of which is disposed in the path of one of said beams and adapted to preferentially absorb certain wave lengths of said infra-red radiation, the first of said filtering means preferentially absorbing said radiation at the wave length of the principal absorption band of carbon dioxide, the second of said filtering means preferentially absorbing said radiation at the wave lengths of the principal absorption bands of carbon monoxide and carbon dioxide, and the third of said filtering means preferentially absorbing said radiation at the wave length of the principal absorption band of carbon monoxide, means for periodically interrupting said beams for four equal periods of interruption separated by four equal intervals of passage of each beam, in sequence, a thermistor having output terminals connected therewith, said thermistor being positioned in the paths of said interrupted beams to respond thereto and to produce pulses of direct current, an amplifier having an input circuit connected to said output terminals and an output circuit, a synchronous commutator means having input terminals connected to the output circuit of said amplifier and output terminals, means for synchronizing said commutator means with the amplified pulses of direct current received from said amplifier, a pair of coupling condensers, one connected to one of said commutator output terminals and the other connected to the other of said commutator output terminals, two voltage doubling circuits, each of said voltage doubling circuits being connected to one of said coupling condensers, two integrating circuits, each of said integrating circuits being connected to the output of one of said voltage doubling circuits and a multiple point recorder, the input terminals of which are connected to the output of said integrating circuits.

11. In an analyzer for measuring the amounts of two components A and B in a fluid stream, a radiant energy indicating system comprising means for forming and sensitizing three beams of radiant energy, the first beam being sensitized to changes in concentration of component A in said fluid stream, the second beam being a standard beam insensitive to changes in concentration of components A and B in said fluid stream, and the third beam being sensitized to changes in concentration of component B in said fluid stream, a rotating chopper means for interrupting said sensitized beams for four equal periods of interruption separated by four equal periods of passage of said beams with each revolution of said chopper, each of said periods of passage being a pulse of radiant energy responsive to one of said beams, the first and third of said pulses being responsive to said first and third sensitized beams, respectively, and the second and fourth of said pulses being responsive to said standard beam, a radiant energy sensitive means in position to respond to said pulses of radiant energy to produce corresponding direct current pulses, each dependent in amplitude upon the intensity of the corresponding beam pulse, an amplifying means, having output terminals and being electrically connected to said radiant energy sensitive means for amplifying said direct current pulses, a synchronous commutator means upon which the amplified direct current pulses are impressed having input terminals connected to the output terminals of said amplifier and having output terminals, means for causing said commutator means to act in synchronism with the impressing thereon of the successive pulses of said current components, whereby said first and second pulses are passed to one output terminal and said third and fourth pulses are passed to the other output terminal, a pair of coupling condensers, one connected to one of said commutator output terminals and the other connected to the other of said commutator output terminals, two voltage doubling circuits, each of said voltage doubling circuits being connected to one of said coupling condensers, two integrating circuits, each of said integrating circuits being connected to the output of one of said voltage doubling circuits and a multiple point recorder, the input terminals of which are connected to the output of said integrating circuits.

12. The method of analyzing a fluid stream for two of its components which comprises establishing three beams of radiation, passing said beams through said process stream, filtering said beams to exclude from the first of said beams said radiation at the wave length of the principal absorption band of one of said components, to exclude from the second of said beams said radiation at the wave lengths of the principal absorption band of both of said components, and to exclude from the third of said beams said radiation at the wave length of the principal absorption band of the other of said components, and comparing the intensity of said first and third beams to the intensity of said second beam.

13. The method of analyzing a fluid stream for two of its components by use of the radiation absorption characteristics of said components which comprises establishing three parallel beams of radiation, passing said beams through the fluid stream to be analyzed, filtering said beams to exclude from the first of said beams said radiation at the wave length of the principal absorption band of one of said components, to exclude from the second of said beams said radiation at the wave lengths of the principal absorption bands of both of said components and to exclude from the third of said beams said radiation at the wave length of the principal absorption band of the other of said components, and electrically comparing the intensity of said first and third beams to the intensity of said second beam to determine the amount of each of said components in said fluid stream.

14. The method of analyzing a fluid stream for the amounts of carbon dioxide and carbon monoxide present therein by the use of the radiation absorption characteristics of carbon dioxide and carbon monoxide which comprises establishing three parallel beams of infra-red radiation, passing said beams through said fluid stream, filtering said beams to exclude from the first of said beams said radiation at the wave-length of the principal absorption band of carbon dioxide, to exclude from the second of said beams said radiation at wave lengths of the principal absorption bands of carbon dioxide and carbon monoxide and to exclude from the third of said beams said radiation at the wave length of the principal absorption band of carbon monoxide and electrically comparing the intensity of said first and third beams to the intensity of said second beam to thereby determine the amounts of carbon dioxide and carbon monoxide in said fluid stream.

15. In an analyzer for measuring the amount of two components A and B in a fluid stream, in combination, a radiation source, a sample cell, means for passing said fluid stream through said cell, radiation detecting means, three filter cells, the first of said filter cells comprising component A, the second of said filter cells comprising components A and B and the third of said filter cells comprising component B, means for passing radiation from said source through said sample cell and through said filter cells to impinge on said radiation detecting means to produce voltages characteristic of the intensity of said radiation impinging on said detecting means, means for comparing said voltages produced by said radiation passing through said first and second filter cells and for producing a first comparison voltage representative of the amount of component B in said fluid stream, and means for amplifying and recording same, and means for comparing said voltages produced by said radiation passing through said third and second filter cells and for producing a second comparison voltage representative of the amount of component A in said fluid stream, and means for amplifying and recording same.

16. The method of analyzing a fluid stream for two of its components A and B, which comprises, establishing a source of radiation, sequentially passing a first beam of said radiation through said fluid stream and a first filtering means comprising component A to a radiation detector to produce a first voltage representative of the intensity of said first beam impinging on said detector, passing a second beam of said radiation through said fluid stream and a second filtering means comprising components A and B to said detector to produce a second voltage representative of the intensity of said second beam impinging on said detector, passing a third beam of said radiation through said fluid stream and a third filtering means comprising component B to said detector to produce a third voltage representative of the intensity of said third beam impinging on said detector, repeating the aforedescribed step with respect to said second beam of said radiation, sequentially comparing said first and second voltages to produce a voltage representative of the amount of component B in said fluid stream and amplifying and recording same, and comparing said third and second voltages to produce a voltage representative of the amount of component A in said fluid stream and amplifying and recording same.

References Cited in the file of this patent

UNITED STATES PATENTS

| | | |
|---|---|---|
| 1,691,138 | Schmick | Nov. 13, 1928 |
| 2,642,536 | Heigl | June 16, 1953 |
| 2,666,854 | Hutchins | Jan. 19, 1954 |
| 2,688,090 | Woodhull et al. | Aug. 31, 1954 |
| 2,741,703 | Munday | Apr. 20, 1956 |